(12) United States Patent
Toronjo et al.

(10) Patent No.: US 12,053,054 B2
(45) Date of Patent: *Aug. 6, 2024

(54) ARTICLE OF FOOTWEAR WITH COMPOSITE UPPER

(71) Applicant: Under Armour, Inc., Baltimore, MD (US)

(72) Inventors: Alan Toronjo, Portland, OR (US); Daniel Lee, Hong Kong (HK); Roger Fan, Hong Kong (HK)

(73) Assignee: Under Armour, Inc., Baltimore, MD (US)

( * ) Notice: Subject to any disclaimer, the term of this patent is extended or adjusted under 35 U.S.C. 154(b) by 695 days.

This patent is subject to a terminal disclaimer.

(21) Appl. No.: 16/722,213

(22) Filed: Dec. 20, 2019

(65) Prior Publication Data

US 2020/0196707 A1 Jun. 25, 2020

Related U.S. Application Data

(60) Provisional application No. 62/782,423, filed on Dec. 20, 2018.

(51) Int. Cl.
*A43B 23/07* (2006.01)
*A43B 23/02* (2006.01)
(Continued)

(52) U.S. Cl.
CPC .......... *A43B 23/07* (2013.01); *A43B 23/0235* (2013.01); *B32B 3/085* (2013.01);
(Continued)

(58) Field of Classification Search
CPC ....... B32B 3/28; B32B 5/022; B32B 2437/02; B32B 5/04; B32B 5/073; B32B 7/04;
(Continued)

(56) References Cited

U.S. PATENT DOCUMENTS

| | | | | |
|---|---|---|---|---|
| 78,287 A | * | 5/1868 | Hill | ......................... A43B 3/101 36/9 R |
| 898,710 A | * | 9/1908 | White | ...................... A43B 9/06 36/55 |

(Continued)

FOREIGN PATENT DOCUMENTS

| | | | | |
|---|---|---|---|---|
| JP | 2529346 Y2 | * | 3/1997 | ............. A43B 23/02 |
| WO | 2017210160 A1 | | 12/2017 | |

OTHER PUBLICATIONS

Emma "'SHAPER' Power Net Spandex 4-Way Mesh"—Offer for Sale at https://www.emmaonesock.com/fabrics/45204?catId=42 ( Year: 2018).*

(Continued)

*Primary Examiner* — Jennifer A Steele
(74) *Attorney, Agent, or Firm* — Maginot, Moore & Beck, LLP (57) ABSTRACT

An article of footwear includes at least one panel comprised of a composite material. The composite material includes a plurality of layers that are secured together according to a predetermined embroidery stitching pattern. The panel includes a first layer having a maximum elongation in a length direction of the article of footwear, and a second layer having a maximum elongation in a width direction of the article of footwear. The composite material also includes additional layers coupled to the first layer and the second layer.

12 Claims, 7 Drawing Sheets

(51) Int. Cl.
  *B32B 3/08* (2006.01)
  *B32B 3/26* (2006.01)
  *B32B 5/02* (2006.01)
  *B32B 5/04* (2006.01)
  *B32B 5/06* (2006.01)
  *B32B 7/022* (2019.01)
  *B32B 7/035* (2019.01)
  *B32B 7/04* (2019.01)
  *B32B 7/12* (2006.01)
  *B32B 27/12* (2006.01)
  *B32B 37/12* (2006.01)
  *B32B 37/14* (2006.01)
  *B32B 37/20* (2006.01)
  *B32B 38/00* (2006.01)
  *B32B 38/18* (2006.01)
  *D05C 9/12* (2006.01)

(52) U.S. Cl.
  CPC .............. *B32B 3/266* (2013.01); *B32B 5/022* (2013.01); *B32B 5/04* (2013.01); *B32B 5/06* (2013.01); *B32B 7/022* (2019.01); *B32B 7/035* (2019.01); *B32B 7/04* (2013.01); *B32B 7/12* (2013.01); *B32B 27/12* (2013.01); *B32B 37/12* (2013.01); *B32B 37/144* (2013.01); *B32B 37/203* (2013.01); *B32B 38/0012* (2013.01); *B32B 38/145* (2013.01); *B32B 38/1825* (2013.01); *D05C 9/12* (2013.01); *B32B 2038/0028* (2013.01); *B32B 2038/008* (2013.01)

(58) Field of Classification Search
  CPC .... B32B 7/05; B32B 7/08; B32B 7/09; B32B 27/12; B32B 37/144; B32B 2038/008; B32B 7/035; A43B 23/0235; A43B 23/025; Y10T 428/24628–428/24727; Y10T 442/00; D10B 2403/02–2403/0231; B29D 35/00
  See application file for complete search history.

(56) References Cited

U.S. PATENT DOCUMENTS

| | | | |
|---|---|---|---|
| 3,198,149 A * | 8/1965 | Schlegel | D05B 11/00 26/96 |
| 4,103,058 A | 7/1978 | Humlicek | |
| 4,349,020 A | 9/1982 | Krikorian | |
| 4,956,878 A * | 9/1990 | Boynton | A41D 7/00 450/11 |
| 5,244,716 A * | 9/1993 | Thornton | A41D 31/102 2/243.1 |
| 5,426,869 A * | 6/1995 | Gore | A43B 7/125 36/12 |
| 5,529,830 A * | 6/1996 | Dutta | A41D 31/102 428/317.1 |
| 5,707,709 A * | 1/1998 | Blake | A61G 17/04 112/470.31 |
| 5,882,769 A * | 3/1999 | McCormack | A61F 13/51 156/308.2 |
| 6,589,638 B1 | 7/2003 | McCormack | |
| 9,936,755 B2 | 4/2018 | Blakely et al. | |
| 2008/0083138 A1* | 4/2008 | Lacorazza | A43B 3/26 36/97 |
| 2014/0023829 A1 | 1/2014 | Broering | |
| 2014/0101816 A1* | 4/2014 | Toronjo | A42B 1/041 36/83 |
| 2014/0109286 A1* | 4/2014 | Blakely | A43B 23/0215 2/69 |
| 2017/0340037 A1 | 11/2017 | Bailey et al. | |
| 2018/0325216 A1 | 11/2018 | Toronjo | |
| 2020/0196705 A1* | 6/2020 | Toronjo | B33Y 80/00 |

OTHER PUBLICATIONS

RainShed "Microfiber Spandex—Black"—Offer for Sale at https://www.therainshed.com/shop/c/p/Microfiber-Spandex-Black-x20843804.htm (Year: 2017).*
Machine Translation of Saburo (JP-2529346-Y2) from Google Patents (Year: 1997).*
Resilient Definition from Oxford Languages (Year: 2022).*

* cited by examiner

ARTICLE OF FOOTWEAR WITH COMPOSITE UPPER

CROSS REFERENCE TO RELATED APPLICATIONS

The present application is a nonprovisional of provisional application 62/782,423, filed 20 Dec. 2018 and entitled "Stretch Material with Lockout Feature," the entire contents of which are incorporated herein by reference in their entirety.

FIELD

This document relates to an article of footwear, and particularly to footwear including an upper with predetermined stretch properties.

BACKGROUND

Many articles of apparel are designed to fit closely to the human body. When designing an article of apparel for a close fit to the human body, different body shapes and sizes must be considered. Different individuals within a particular size will have different body shapes and sizes. For example, two individuals wearing the same shoe size may have very differently shaped feet. As another example, two individuals wearing the same shirt size may have very different chest to abdomen dimensions. In addition to accounting for different body measurements for different individuals within a size, articles of apparel designed to fit close to the human body may also need to provide sufficient strength and support for the user. For example, when fabric is used on a shoe, the fabric must be capable of supporting the foot of the wearer and limiting movement of the foot within the shoe. The need for proper support in combination with variable measurements between similarly sized individuals makes proper design of closely fitting articles of apparel difficult.

In view of the foregoing, it would be desirable to provide a garment or other article of apparel comprised of a fabric that is capable of conforming to various body shapes within a given size range. It would also be desirable to provide a fabric that is strong and capable of providing proper support to various areas on the human body. Furthermore, it would be advantageous for such fabric to be comfortable against human skin while also managing perspiration and moisture for the wearer. In addition, it would be desirable for such a garment or article of apparel to be attractive, relatively inexpensive and easy to manufacture.

SUMMARY

In accordance with at least one embodiment of the disclosure, an article of footwear includes at least one panel comprised of a composite material. The composite material includes a plurality of layers that are secured together according to a predetermined embroidery stitching pattern. The panel includes a first layer having a maximum elongation in a length direction of the article of footwear, and a second layer having a maximum elongation in a width direction of the article of footwear. The composite material may also include additional layers coupled to the first layer and the second layer.

In accordance with one exemplary embodiment of the disclosure, there is provided an article of apparel that comprises an outer layer, a resilient base layer, and a reinforcement layer positioned between the outer layer and the resilient base layer. The layers are coupled together by a stitch network that controls the expansion pattern of the composite. For example, the stitch network forms an auxetic structure capable of lowering the Poisson's ratio of the composite. The resilient base layer is provided by an elastic material that is elastically deformable between a resting configuration and a stretched configuration. The resilient base layer is configured to stretch to a maximum elongation. The stitch network and the reinforcement layer are configured to delimit the stretch amount of the resilient base layer when the resilient base layer is stretched.

In accordance with yet another exemplary embodiment of the disclosure, there is provided a method of manufacturing a panel of composite material for an article of footwear. The method includes stretching a resilient first layer from a resting configuration to a stretched configuration. The method further includes engaging a second layer with the first layer when the first layer is in the stretched configuration. The first and second layers are then embroidery stitched to couple the layers together. The embroidery stitching provides a stitch network forming a plurality of cell units on the composite material. In at least one embodiment, the stitch network forms an auxetic structure. After embroidery stitching the first and second layers, the first layer is released from the stretched configuration and returns to an unstretched/contracted state. When the resilient layer returns to the contracted state, bulges are formed in each of the cell units by the second layer.

The above described features and advantages, as well as others, will become more readily apparent to those of ordinary skill in the art by reference to the following detailed description and accompanying drawings. While it would be desirable to provide an article of apparel and a method that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

Like numerals have been utilized to identify like components throughout the figures.

DETAILED DESCRIPTION

As for the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Figure 1:
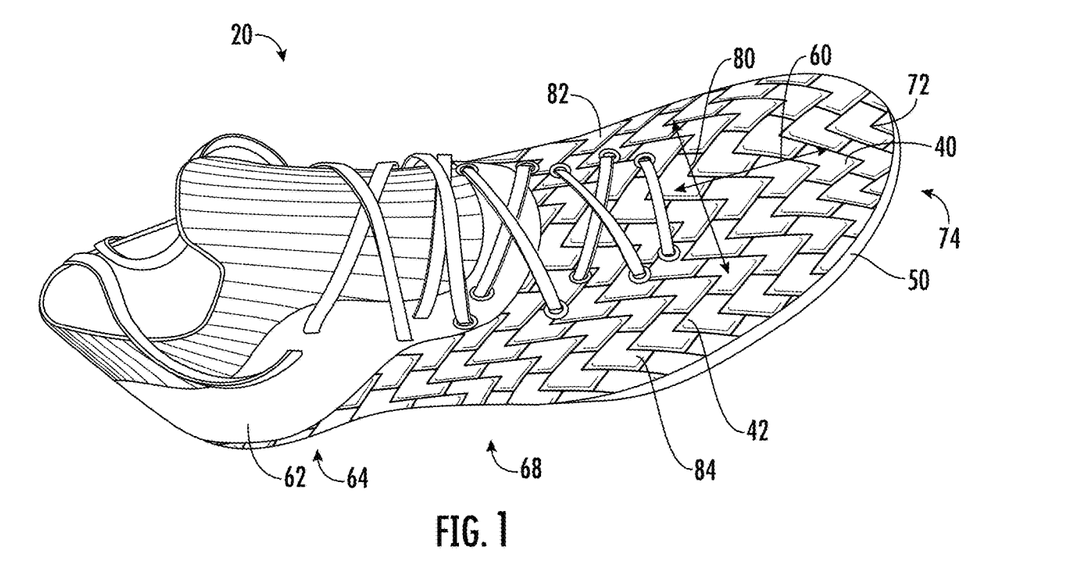
FIG. 1 is a perspective view of an article of footwear including an upper formed of a composite material.
Figure 2:
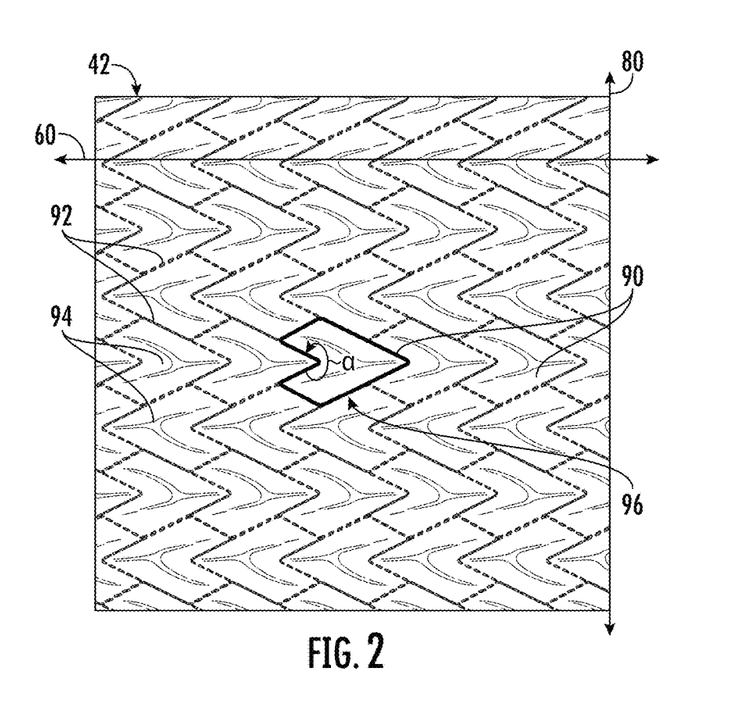
FIG. 2 is an exploded plan view of the composite material of FIG. 1.

With reference to FIGS. 1 and 2, an article of footwear 20 includes at least one panel comprised of a composite material or textile 100. As described in further detail herein, the composite material 100 includes a plurality of layers that are secured together according to a predetermined embroidery stitching pattern. The composite material 100 includes a first/outer layer 110 having a maximum elongation in a length direction of the article of footwear, and a second layer 120 (see FIG. 3) having a maximum elongation in a width direction of the article of footwear. The composite material 100 may also include additional layers coupled to the first layer 110 and the second layer 120.

In at least one embodiment the article of footwear 20 is an athletic shoe or cleat including an upper 40 connected to a sole 50. The shoe defines a length direction 60 extending longitudinally from the heel 62 to a toe 72 of the shoe. The heel 62 is arranged in a hindfoot region 64 of the shoe, the toe 72 is arranged in a forefoot region 74 of the shoe. A midfoot region 68 of the shoe is provided between the hindfoot region 64 and the forefoot region 74. The shoe also defines a width direction 80 extending laterally from a medial side 82 to a lateral side 84 of the shoe.

The upper 40 includes a single panel 42 of the composite material 100 that provides a vamp for the shoe. The panel 42 extends longitudinally from the forefoot region 74 to midfoot region 68 and/or the hindfoot region 64. The panel 42 also extends laterally across the article of footwear 20 at least in the forefoot region 44, spanning from the medial side 82 to the lateral side of the shoe.

The panel 42 is embroider stitched in a patterned strand network that secures various layers of the panel together. The patterned strand network includes various lines of stitching 92 that results in a plurality of cell units 90 formed on the panel 42. Each cell unit 90 is defined along a perimeter by the stitching 92. The outer surface of the panel 42 is recessed along the lines of stitching 92 and includes bulges 94 between the stitching 92. As a result, the panel 42 has a contoured outer surface that includes numerous cell units 90 with recessed perimeter portions and bulging interior portions.

The lines of stitching 92 may be any of various different types of embroidery stitches. In at least one embodiment, the embroidery stitches are chain stitches such that the loops on both sides of the panel 42 are linked together. However, other types of embroidery stitches may also be utilized. The threads that form the embroidery stitching 92 include a top thread exposed on the outer/first layer 110, and a bobbin thread exposed on an inner layer opposite the outer layer 110. The stitch length typically ranges from 1 mm to 8 mm, and is preferably less than 5 mm (e.g., 2-2.5 mm) to provide strength for the resulting stitch network. The top and bobbin threads have sufficient tensile strength and low elongation (e.g., less than 50% and preferably less than 30% elongation). The threads, moreover, are continuous filament strands. By way of specific example, the top and bobbin threads may be nylon (nylon 6,6) threads. In another embodiment, the threads are formed of ultra-high molecular weight polyethylene. The top and bobbin threads are typically identical in size and composition in order to provide appropriate strength for the stitch network. This is in contrast with conventional embroidery techniques, which utilizes different top and bobbin threads (e.g., the bobbin threads are smaller or formed of different material). Thread sizes typically range from M30 to M60. One commercial example is NYLBOND from Coats Industrial.

In at least some embodiments, the strand network formed by the lines of stitching 92 results in auxetic pattern of reentrant-shaped cell units 90. A reentrant shape may also be referred to as a "concave", or "non-convex" polygon or shape, which is a shape having an interior angle with a measure that is greater than 180°. Each of the cell units 90 in FIG. 2 is defined by a perimeter having a reentrant shape 96. The reentrant shape 96 includes an interior angle α that possesses a measurement of greater than 180°. Patterns of reentrant shapes are often associated with auxetic structures having a negative Poisson's ratio. In other words, when stretched, auxetic structures tend to expand, becoming thicker (as opposed to thinner), in a direction perpendicular to the applied force. In at least one embodiment, this expansion occurs due to inherent hinge-like configurations within the materials or structures which flex when stretched. In contrast, structures with a positive Poisson's ratio tend to contract (i.e., become thinner) in a direction perpendicular to the applied force. The term "auxetic" as used herein refers to structures or materials that possess or exhibit a negative (below zero) Poisson's ratio at some point during stretch. The term "near auxetic" is used herein to refer to a structure having a Poisson's ratio of approximately zero and, in particular, less than +0.15 (i.e., from about 0 to +0.15).

The cell units 90 shown in FIG. 2 generally have an arrowhead configuration. One of the cell units 90 is highlighted in bold in FIG. 2 to further emphasize this shape. The arrowheads are aligned on the upper such that the arrowheads point along the length direction 60. Accordingly, a primary elongation direction of the auxetic shape provided by each arrowhead is oriented along the length direction 60, and a secondary elongation direction is oriented along the width direction 80 of the upper 40. However, it will be recognized that numerous other arrangements and shapes of the cell units 90 are possible, including various reentrant shapes and non-reentrant shapes. In at least one alternative embodiment, the lines of stitching 92 result in reentrant shapes in the form of bow-tie or hourglass-shaped cell units. In other embodiments, the lines of stitching 92 do not form reentrant shapes, and instead form more standard shapes such as rectangles, hexagons, octagons, or other regular polygons. In various embodiments, the cell units 90 formed by the lines of stitching 92 may or may not result in an auxetic or near-auxetic structure for the panel 42. For example, the pattern may lower the Poisson's ratio of the fabric (compared to other patterns or compared to no stitching), but not generate a stretch pattern that is near auxetic or auxetic. However, in at least some embodiments, and particularly embodiments with cell units 90 having reentrant shapes, the cell units 90 tend to lower the Poisson's ratio of the panel (as compared to a panel lacking auxetic shapes).

Figure 3:
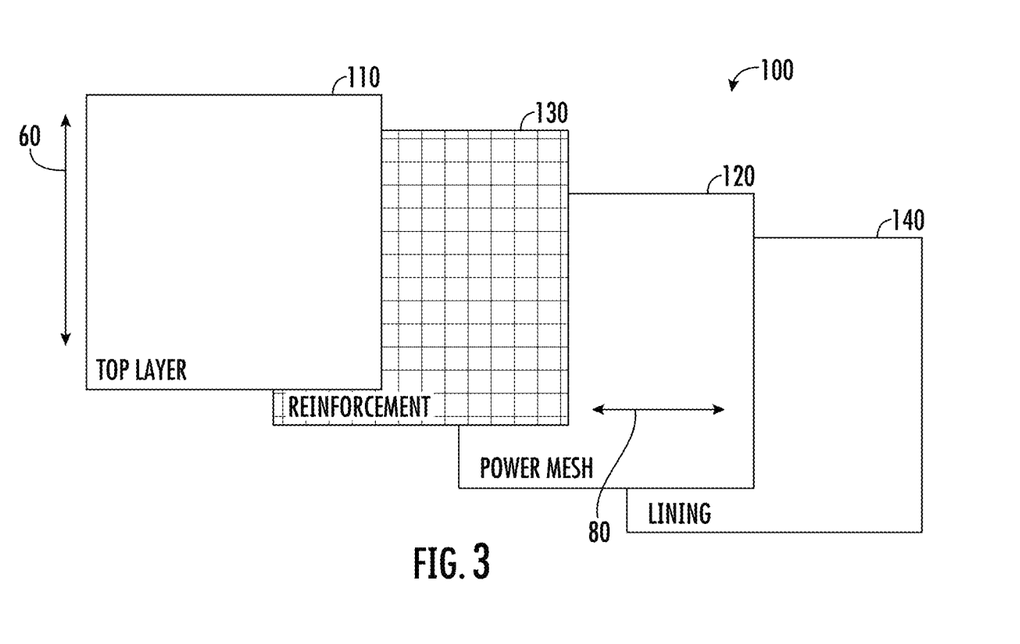
FIG. 3 is diagram showing a plan view of multiple layers forming the composite material of FIG. 1.

The panel 42 of the shoe 20 is provided by a portion of the composite material 100 cut into a shape to form the panel 42. With reference now to FIG. 3, the composite material 100 includes a plurality of layers. The layers of the composite material 100 include a first/outer layer 110, a second/middle layer 120, and one or more additional layers (e.g., a reinforcement layer 130 and an inner/lining layer 140) which are coupled to the first and second layers 110, 120. The layers 110, 120, 130, 140 are overlaid on one another, as illustrated in FIG. 3. The layers 110, 120, 130 and 140 are coupled together using a method of manufacture that provides desirable performance and aesthetic qualities for the material (such method of manufacture is described subsequently herein with reference to FIG. 4).

With continued reference to FIG. 3, each of the layers 110, 120, 130 and 140 include distinct performance properties and are arranged relative to one another with a specific orientation. In the embodiment of FIG. 3, the first layer 110 (which may also be referred to herein as "less resilient layer") is an outer layer provided by a pliant material with excellent flex characteristics. The first layer 110 has a limited two-way stretch, with its maximum elongation (a maximum stretch percentage for the material that does not exceed the elastic limit) oriented along the length direction of the shoe (as illustrated by arrow 60 in FIG. 3). The maximum elongation/stretch of the first layer 110 in the length direction 60 is less than 50%, and preferably less than 30%. In at least one embodiment, the stretch of the first layer 110 in the length direction is 10% or less. Because the first layer 110 is a two-way stretch material, the stretch in the width direction 80 is significantly limited (e.g., less than 5%). When the composite material 100 is configured for use with a shoe requiring significant stability, the first layer 110 will preferably have little to no stretch. Depending on the application, the first layer 110 may be further configured to provide good abrasion resistance, bursting strength, and bally flex. In some embodiments, the first layer 110 may include a relatively thin brushknit or microfiber backer. In at least one embodiment, the first layer 110 is provided by a film or a nonwoven web (e.g., a non-woven fabric consisting of ultra-fine fibers which are impregnated with polyurethane). For example, the first layer 110 may be provided by a relatively thin synthetic leather material (e.g., a polyurethane material having a thickness of 0.8 mm or less). The synthetic leather is typically relatively simple and smooth such that it is conducive to buckling. In another embodiment, the first layer may be provided by a single layer of fabric that is relatively thin provides the required flex features and other characteristics, such as abrasion resistance and strength. The overall thickness of the first layer 110 is generally less than 2 mm, and preferably less than 1 mm (e.g., 0.8 mm). It will be recognized that the thickness of the first layer 110 depends at least in part on the strength of the second layer 120, as the first layer 110 is configured to be controlled/overpowered by the second layer 120.

The second layer 120 is a resilient middle layer for the composite material 100. The second layer 120 is provided by a power mesh material having four-way elastic stretch and recovery, with its maximum elongation oriented along the width direction (as illustrated by arrow 80 in FIG. 3). Thus, it will be recognized that the maximum elongation of the second layer 120 is oriented in a direction that is perpendicular to the maximum elongation of the first layer 110. The maximum elongation of the second layer 120 is at least 100% and preferably 200% or more (e.g., in at least one embodiment, 219%). The stretch of the second layer 120 in the length direction 60 is generally less than the stretch of the second layer 120 in the width direction 80. In at least one embodiment, the stretch of the second layer is at least 50%, and preferably 64% or more. Because of the stretch associated with the second layer 120, the second layer 120 provides a resilient layer for the composite material. The second layer 120 possesses high recovery properties. For example, recovery of the second layer 120 in both the length and width directions is greater than 80%, and preferably 90% or more. The second layer 120 is also sufficiently strong such that it controls the movement of the other layers, and particularly the first layer 110. For example, when the second layer 120 elastically recovers (contracts/draws inwardly), all other layers of the composite material 100 should draw inwardly with the second layer 120. In at least one embodiment, the second layer 120 is provided by a dense knit structure that provides a significant level of hold and is moisture resistant. In at least some embodiments, the second layer 120 is formed of a microfiber four-way stretch fabric such as elastane fabric or other compression material including elastomeric fibers (e.g., a knitted or woven fabric comprising greater than 50% elastane (e.g., 65% or more)).

The reinforcement layer 130 provides a third layer of the composite material 100 that is positioned between the first layer 110 and the second layer 120. As explained in further detail below, the reinforcement layer 130 provides a lockout feature to the composite material 100, limiting the overall amount of stretch of the completed composite material 100. Accordingly, the reinforcement layer 130 has a very limited two-way stretch (e.g., mechanical stretch), with its maximum elongation oriented along the length direction 60 (as illustrated by arrow 60 in FIG. 3), with little or no stretch in the width direction 80 (as illustrated in FIG. 3). For example, the maximum elongation/stretch of the reinforcement layer 130 in the length direction 60 may be less than 30%, and preferably 10% or less. The reinforcement layer 130 is provided by a lightweight, pliant material with excellent flex and strength characteristics. In at least one embodiment, the reinforcement layer 130 is provided by a warp knitted fabric. In an alternative embodiment, the reinforcement layer 130 is provided by a woven structure. In any event, the structure must be sufficiently tight that the stitches do not slip under a strain. In some embodiments, the reinforcement layer 130 is not cemented or otherwise adhered to the outer layer 110. However, in at least some embodiments, the reinforcement layer 130 is adhered to the outer layer 110, but the reinforcement layer 130 and outer layer 110 remain sufficiently thin and pliable to collapse and be controlled by the second layer 120.

The lining layer 140 provides a fourth layer of the composite material 100 that is positioned adjacent to the second layer 120 on an inner side of the material. Accordingly, the lining layer 140 provides the inner layer of the panel 42 that is configured to face the body of the wearer (e.g., the inside of the upper 40). The lining layer 120 has a two-way stretch, with its maximum elongation oriented along the length direction 60 (as illustrated by arrow 60 in FIG. 3), with little or no stretch in the width direction 80 (as illustrated in FIG. 3). For example, the maximum elongation/stretch of the lining layer 120 in the length direction 60 may be less than 50%, and preferably 25% or less. The lining layer 120 is provided by a thin, pliant material. However, in some applications the lining layer 120 be thicker than others. In at least one embodiment, the lining layer 120 is provided by a relatively dense knitted fabric. The lining layer is not slick and is defined by a surface having a coefficient of friction that provides drag or "grip." To this end, the lining layer 120 may include some texture, such as a waffle grid. The lining layer is sufficiently dense and strong to retain back looping of the embroidery stitches 92.

Figure 4:
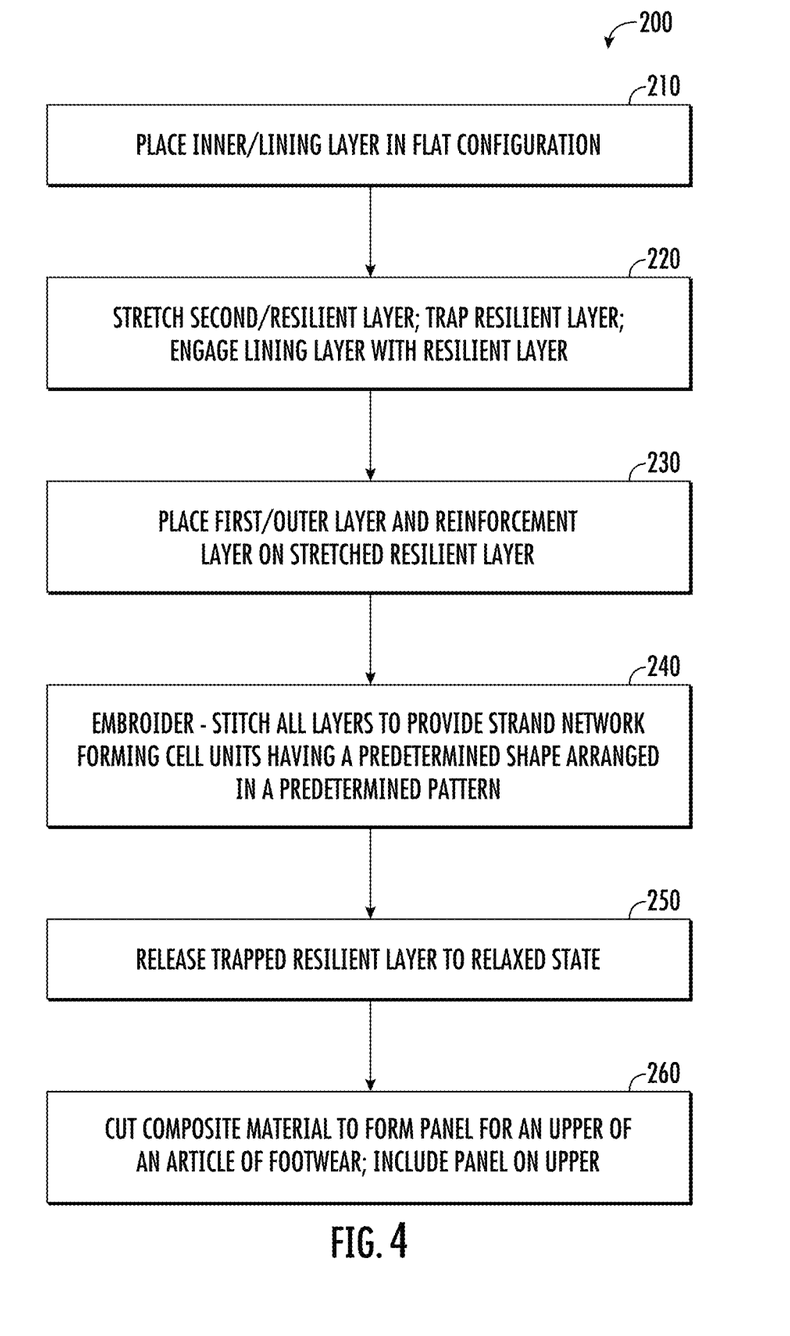
FIG. 4 is a block diagram showing a method of manufacturing the composite material of FIG. 1.

With reference now to FIG. 4, a block diagram illustrates a method 200 of forming the composite material 100. The method 200 begins at block 210 when the lining layer 140 is placed in a flat configuration, such as on a table or other surface, or retained within a rack. Although the lining layer 140 is unstretched, it may be retained in a taut/pulled stated in order to render the lining layer flat.

Next, the method 200 proceeds to block 220 where the resilient layer 120 is placed under tension and stretched to at least 100% in the maximum elongation direction (i.e., the width direction 80). For example, in at least one embodiment, the resilient layer 120 may be stretched to an elongation between 130% and 165%, or more, but not more than the maximum elongation of the resilient layer 120. A rack or other apparatus may be used to stretch the resilient layer 120. The resilient layer 120 is engaged with the lining layer 140 while the resilient layer 120 remains in trapped in the stretched position. For example, the stretched resilient layer 120 may be laid flat upon the unstretched lining layer 140 with the resilient layer 120 remaining in the rack to maintain the stretch on the resilient layer 120. In the embodiment of FIG. 4, the method involves only stretching the resilient layer 120 in the width direction 80, in at least some embodiments, the resilient layer may also be stretched in the length direction 60 (e.g., 50%, 100% or more elongation).

Figure 5:
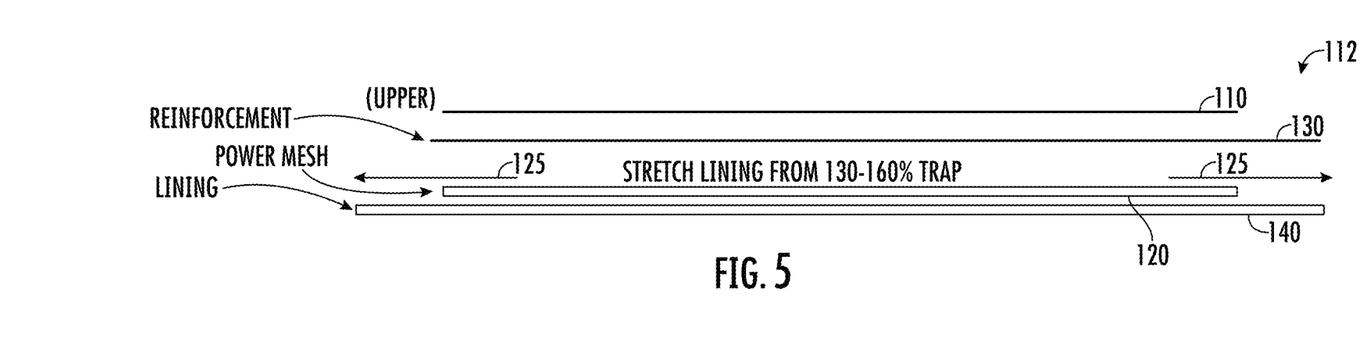
FIG. 5 is a diagram showing a side view of the multiple layers of the composite material and the manipulation of a resilient layer of the composite material during the method of manufacture of FIG. 4.

After the resilient layer 120 is stretched and engaged with the lining layer 110, the method 200 moves to block 230, and the reinforcement layer 130 is engaged with the stretched resilient layer 120. The outer layer 110 is also engaged with the reinforcement layer 130 and placed upon the resilient layer 120 in order to form a stack of layers of the composite material 100. FIG. 5 illustrates this stack 112 of layers in the following arrangement from top to bottom: the outer layer 110, the reinforcement layer 130, the resilient layer 120, and the lining layer 140. The arrows 125 in FIG. 5 illustrate that the resilient layer 120 is the only layer that is stretched upon the stack 112. While all of the other layers 110, 130 and 140 may be taut and flat, the other layers are not stretched to any significant degree.

Figure 8:
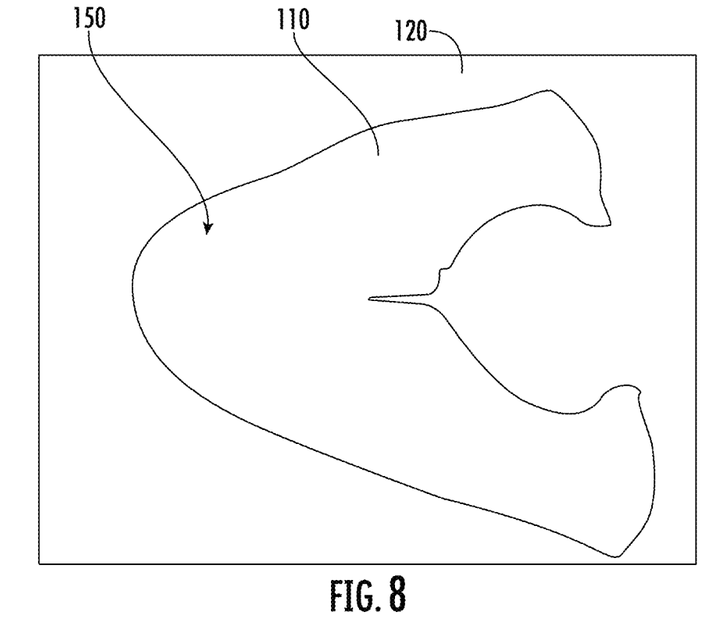
FIG. 8 shows a pliable layer positioned on the stretched resilient layer during the method of manufacture of FIG. 4.

In at least one embodiment, the outer layer 110 and the reinforcement layer 130 are pre-cut into a desired panel shape prior to being laid upon the stack 112. For example, as shown in FIG. 8, the outer layer 110 is shown pre-cut into the shape of a vamp panel 150 for an upper of an article of footwear. The reinforcement layer 130 (not shown in FIG. 8) is cut into the same shape and aligned with the outer layer 110 (e.g., either coupled together or loosely laid on top of one another). The reinforcement layer 130 of the pre-cut vamp panel 150 is then laid upon the stretched resilient layer 120. As shown in FIG. 8, the outer layer 110 covers the reinforcement layer 130 as it rests on the resilient layer 120. Accordingly, it will be recognized that at least two embodiments exist for performing the acts associated with block 230 of method 200. In a first embodiment shown in FIG. 8, the reinforcement layer 130 and outer layer 110 are first cut into a predetermined panel shape and then laid on top of one another on the stretched resilient layer 120. In a second embodiment, no layers are pre-cut and large areas of each layer are engaged with one another prior to any cutting of the layers into predetermined shapes.

Returning now to FIG. 4, after the outer layer 110 and reinforcement layer 130 are laid upon the stretched resilient layer 120 as noted in block 230, the method 200 then moves to block 240 and stitching is performed on the entire stack 112. The stitching occurs while the resilient layer 120 remains in the stretched/elongated state and the other layers 110, 130 and 140 are unstretched. All layers of the stack 112 are embroider stitched to create a strand network forming numerous cell units of the predetermined shape and configured in a predetermined pattern. For example, the strand network may form reentrant shaped cell units that are provided in the pattern of an auxetic structure, such as that shown in FIG. 2. As noted previously, the stitches that form the strand network are embroidered stitches that include a top thread showing on the outside (i.e., layer 110) and a bobbin thread showing on the inside (i.e., layer 140) of the resulting composite material 100.

Figure 6:
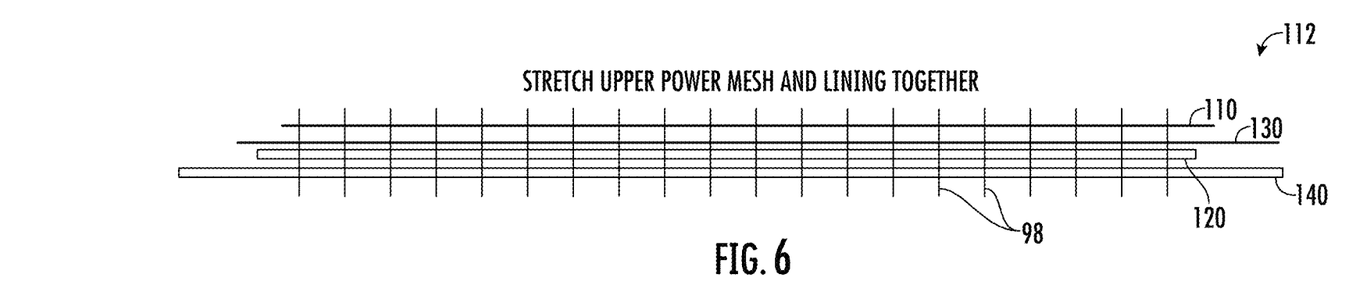
FIG. 6 is a diagram illustrating stitching of the multiple layers of the composite material during the method of manufacture of FIG. 4.

FIG. 6 illustrates the stitching associated with the four layers of the stack 112, including threads 98 extending through each of the layers 110, 120, 130 and 140. While the threads 98 of FIG. 8 are shown separate from one another and terminating on opposite sides of the stack 112, it will be appreciated that this illustration is simply to show that threads are inserted through each of the layers 110, 120, 130 and 140 during the embroidery process. Again, this stitching occurs while the resilient layer 120 remains in the stretched/elongated state and the other layers 110, 130 and 140 are unstretched. As noted previously, any of various types of embroidery stitches may be utilized, but at least one embodiment of the embroidery stitching results in a top thread showing on the outer layer 110 and a bobbin thread showing on the inner lining layer 140. In various embodiments, the stitching is the primary means for coupling the various layers together, and no additional coupling mechanisms or materials are needed. However, in at least some embodiments, adhesives or other components may also be used to couple two or more layers together (e.g., the outer layer 110 and the reinforcement layer 130 may be coupled with an adhesive). Also, in at least some embodiments, adhesives or other coupling mechanisms are used to couple various layers along the perimeter of the panel without extending to the interior of the panel, thus leaving most of the cell units with no coupling between the layers other than the stitching.

Figure 9:
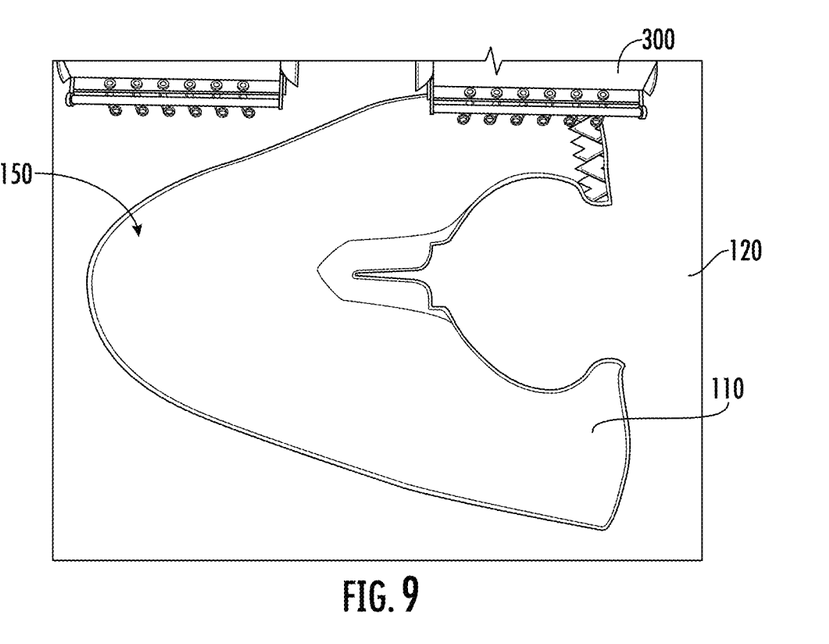
FIG. 9 shows the composite material at the beginning of stitching during the method of manufacture of FIG. 4.
Figure 10:
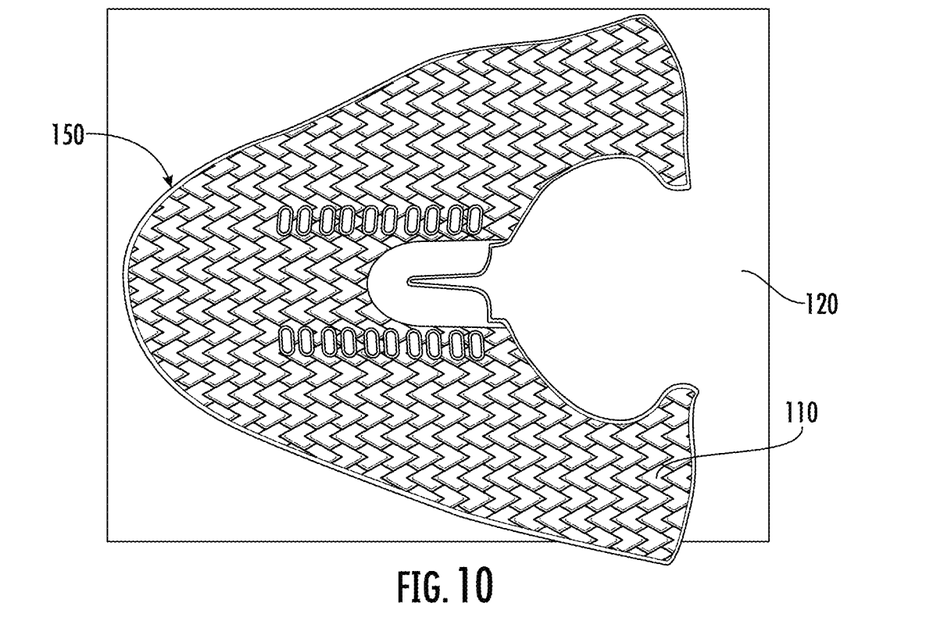
FIG. 10 shows the composite material upon completion of stitching during the method of manufacture of FIG. 4.

FIG. 9 illustrates the pre-cut vamp panel 150 of FIG. 8 at a start of the stitching process of block 240. As shown in FIG. 9, an embroidery machine 300 performs stitching on the vamp panel 150, starting one region of the panel (e.g., a midfoot or hindfoot region) and then progressing to other regions of the panel 150. FIG. 10 illustrates the pre-cut vamp panel 150 at completion of the stitching process of block 240. As shown in FIG. 10, the embroidery process results in a strand network forming numerous cell units, each having a predetermined shape, and collectively configured in a predetermined pattern. In the embodiment of FIG. 10, the strand network forms reentrant shaped cell units that are provided in the pattern of an auxetic structure, such as that shown in FIG. 2.

Figure 7:
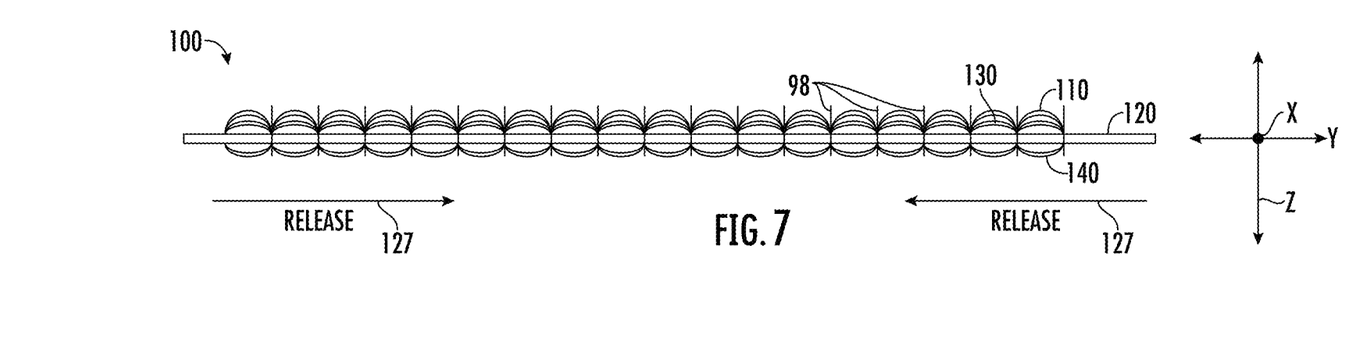
FIG. 7 is a diagram illustrating release of the resilient layer of the composite material during the method of manufacture of FIG. 4.

Returning again to FIG. 4, after the stitching process of block 240, the method moves on to perform the acts of block 250. At block 250 the resilient layer 120, which was trapped in the stretched state during the entire stitching process, is released. FIG. 7 illustrates the behavior of the layers 110, 120, 130 and 140 when the resilient layer 120 is released. As noted by arrows 127 in FIG. 7, when the resilient layer 120 is released, the resilient layer 120 contracts inwardly toward its unstretched state. Because the other layers 110, 130 and 140 are all coupled to the resilient layer 120 by the stitch network, and because the resilient layer 120 is the dominant layer of all the layers, as it undergoes elastic recovery, the resilient layer 120 pulls the other layers inward with it along the stitch lines. As the resilient layer 120 contracts, each cell formed by the stitching network buckles/bulges outward, away from the resilient layer 120. In other words, if the plane defined by the resilient layer 120 defines the x-direction and y-direction, each resulting cell of the composite material 100 protrudes outward from this plane in the z-direction. While the outer layer 110, reinforcement layer 130, and lining layer 140 buckle, the resilient layer 120 does not buckle. In at least some embodiments, a period of time (e.g., 30-60 minutes) may be required for the resilient layer 120 to fully elastically recover (contract/retract) all of the other layers into the contracted state such that the cell units 90 exhibit fully swollen bulges 94 in the interior portions.

Figure 11:
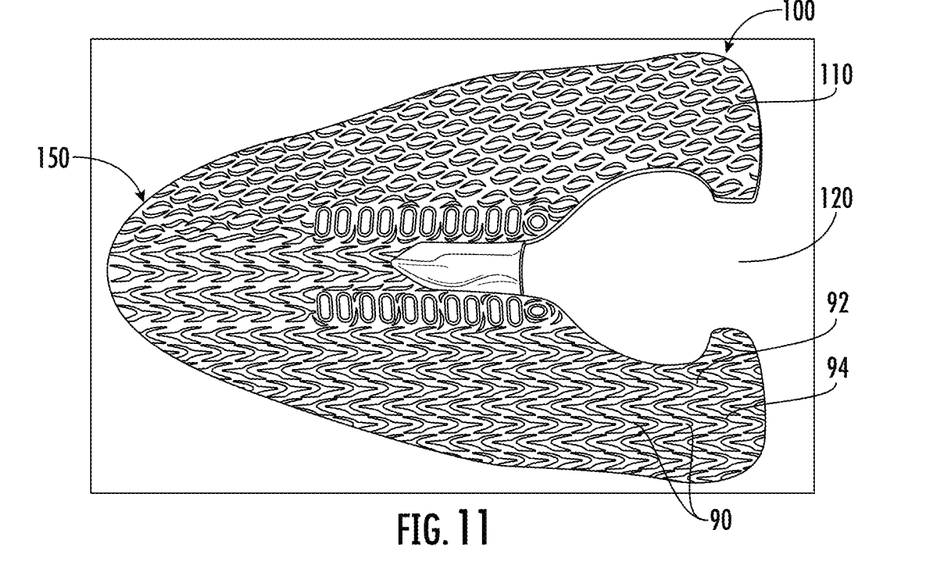
FIG. 11 shows the composite material after release of the resilient layer during the method of manufacture of FIG. 4.

FIG. 11 shows the composite material 100 with pre-formed vamp panel 150 of FIG. 10 after some time has passed following the resilient layer 120 being released from the stretched state. As shown in FIG. 11, the outer surface of the composite material 100 is defined by numerous cell units 90, including a bulge 94 formed within each cell unit, and recessed portions along the lines of stitching 92 that define the perimeter of each cell unit. This is similar to the arrangement shown in FIG. 2. With this configuration, the material includes an array of cells 90, each cell capable of splaying or flattening out under load. Each cell will splay until it completely flattens, locking out due to the embroidery. In at least some embodiments, the reinforcement layer 130 also provides a lockout for the amount of splay possible when the composite material is placed under load.

After the resilient panel is released from the stretched state in block 240 of FIG. 4, and a proper period of time expires, the method continues to block 260 and the composite material 100 is cut into the predetermined shape. For example, the composite material 100 may be cut into the shape of a vamp panel for the upper of a shoe. If the composite material 100 was formed with the outer layer 110 and reinforced layer 130 pre-cut into the desired shape, the composite material 100 may be cut using the outer layer 110 as a guide. For example, a die may be aligned with the perimeter of the outer layer 110 (e.g., see FIG. 11) and used to cut the desired panel with all layers of the composite material 100.

After the composite material 100 is cut into the shape of a panel, the method is complete when the panel is incorporated into an upper for an article of footwear, as noted at block 260 of FIG. 4. The upper, while durable, possesses improved fit because the stretch adapts to the users foot with each cell unit capable of stretching to a desired extent for the given area of the foot. This applies not only when the wearer dons the foot, but as the wearer moves along a surface and various forced are applied to the upper by the foot. The composite is dynamic, adjusting to load conditions as the user moves, but does not expand beyond the lockout limits defined by the auxetic structure of the cell units and/or any reinforcement layer. In other words, the panel enables dynamic expansion of the upper during use (e.g., during a sporting activity), with the auxetic structure and/or the reinforcement layer capable of expanding until the point of lockout, as explained above. The shoe of FIG. 1 is provided as exemplary embodiment of an article of footwear including a panel formed of the composite material 100. In alternative embodiments, more or fewer panels can be arranged in various locations on an article of footwear to control the amount of stretch at each portion of the article of footwear as desired.

Figure 12:
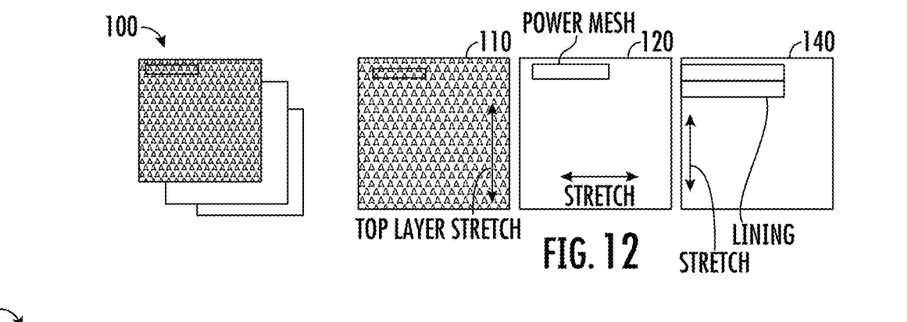
FIG. 12 is diagram showing a first alternative embodiment of the multiple layers forming the composite material of FIG. 1.

While the embodiments of the composite material 100 disclosed above include four layers of material (i.e., an outer layer 110, a resilient layer 120, a reinforcement layer 130 and a lining layer 140), it will be recognized that alternative embodiments of the composite material 100 are possible with fewer layers, more layers, a different arrangement of the layers, or different materials used for each layer. A process similar to that disclosed in association with FIG. 4 may be used to form the alternative embodiments. For example, FIG. 12 shows an alternative embodiment of the composite material 100 with only three layers. The three layers include an outer layer 110, a resilient layer 120, and a lining layer 140. The layers in this embodiment are the same as that shown in FIG. 3, except the reinforcement layer 130 does not exist.

Figures 13, 14:
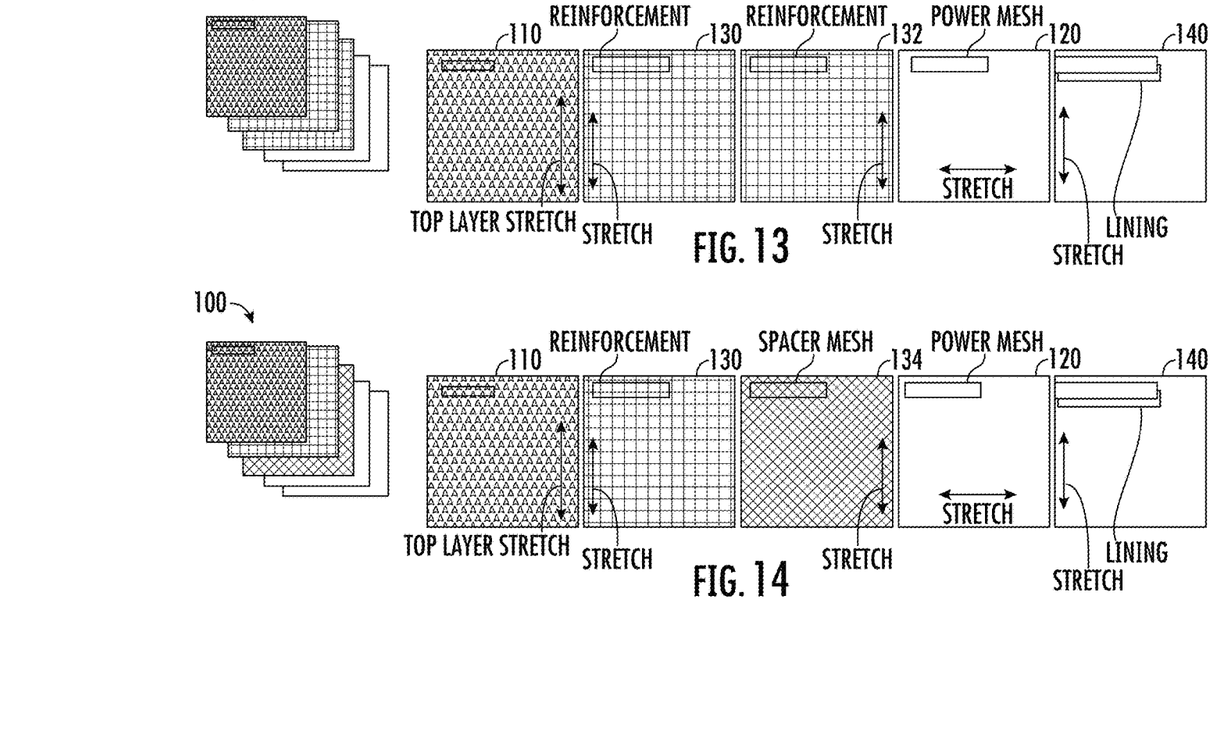
FIG. 13 is diagram showing a second alternative embodiment of the multiple layers forming the composite material of FIG. 1.
FIG. 14 is diagram showing a third alternative embodiment of the multiple layers forming the composite material of FIG. 1.

Another example of an alternative embodiment of the composite material 100 is shown in FIG. 13. In this embodiment, the composite material 100 includes five layers. The five layers include an outer layer 110, a first reinforcement layer 130, a second reinforcement layer 132, a resilient layer 120, and a lining layer 140. The layers in this embodiment are the same as that shown in FIG. 3, except the second reinforcement layer 132 is added to provide additional strength and lockout properties to the composite material. The second reinforcement layer 132 is comprised of the same or similar material to that of the first reinforcement layer 130. One advantage of additional layers is improved performance of certain characteristics of the composite material. For example, with each additional layer, the performance attributes of the composite material such as puncturing resistance improves.

Yet another example of an alternative embodiment of the composite material 100 is shown in FIG. 14. In this embodiment, the composite material 100 also includes five layers. The five layers include an outer layer 110, a reinforcement layer 130, a spacer layer 134, a resilient layer 120, and a lining layer 140. The layers in this embodiment are the same as that shown in FIG. 3, except the spacer layer 134 is added to provide additional strength and separation between the reinforcement layer 130 and the resilient layer 120. The spacer layer 134 is comprised of a lightweight spacer mesh that is easily pliant and yields to the more powerful resilient layer 120. Again, in this embodiment, the additional layer 134 provides improved performance characteristics such as improved puncture resistance.

The foregoing detailed description of one or more exemplary embodiments of the articles of apparel including auxetic structures has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. An article of footwear comprising:
a sole defining a length direction and a width direction of the article of footwear; and
an upper connected to the sole, the upper including at least one panel including a plurality of layers that are secured together by an embroidery stitching pattern, wherein each of the plurality of layers is defined by a single maximum elongation for said layer wherein said maximum elongation is oriented in either the length direction or the width direction, the plurality of layers including a first layer having a maximum elongation in the length direction of the article of footwear such that the elongation of the first layer in the length direction is greater than the elongation of the first layer in the width direction, and a second layer having a maximum elongation in the width direction of the article of footwear such that the elongation of the second layer in the width direction is greater than the elongation of the second layer in the length direction;
wherein the first layer is an outer layer of the upper provided by a synthetic leather material;
wherein the second layer is provided by a microfiber four-way stretch fabric including elastomeric fibers;
wherein the embroidery stitching pattern is provided by embroidered stitches including a top thread exposed on the outer layer, wherein a plurality of cells are formed on the first layer by the embroidery stitching pattern, and wherein an outer surface of the first layer is buckled such that an interior of each cell bulges outward on the outer layer of the upper.

2. The article of footwear of claim 1 wherein the maximum elongation of the first layer in the length direction is greater than or equal to 10% and less than 30% and wherein the maximum elongation of the second layer in the width direction is greater than 100%.

3. The article of footwear of claim 2 wherein the maximum elongation of the first layer in the length direction is 10%.

4. The article of footwear of claim 2 wherein the second layer is a resilient layer positioned inwardly from the outer layer on the article of footwear.

5. The article of footwear of claim 4 wherein the second layer is provided by a mesh material having four-way elastic stretch and recovery.

6. The article of footwear of claim 4 wherein the maximum elongation of the second layer is at least 100%.

7. The article of footwear of claim 4 wherein a recovery of the second layer in both the length direction and the width direction is greater than 80%.

8. The article of footwear of claim 1 wherein the length direction is perpendicular to the width direction.

9. The article of footwear of claim 1 wherein the embroidery stitching pattern defines an auxetic structure.

10. The article of apparel of claim 1 further comprising a reinforcement layer positioned between the first layer and the second layer, the reinforcement layer configured to delimit a degree of stretch of the second layer.

11. An article of footwear comprising:
a sole; and
an upper connected to the sole, the upper including at least one composite panel including a plurality of layers that are secured together by an stitch network that defines a plurality of cell units of the composite panel,
wherein each of the plurality of layers is defined by a maximum elongation for said layer, said maximum elongation for said layer defined by an elongation percentage in one direction of said layer that is greater than an elongation percentage in a perpendicular direction of said layer, wherein said maximum elongation is oriented in either a first direction or a second direction on the article of footwear, wherein the first direction is perpendicular to the second direction,
wherein the plurality of layers include a second layer that is a resilient layer comprised of a four-way stretch fabric having elastomeric fibers and a first layer that is a less resilient layer provided by a synthetic leather material, the second layer having four-way stretch capabilities such that the second layer is configured to expand from a contracted state to a stretched state in both the first direction and the second direction with the maximum elongation of the second layer in the first direction, the first layer having two-way stretch capabilities with the maximum elongation of the first layer in the second direction, wherein the elongation of the first layer in the second direction is less than the elongation of the second layer in the second direction, wherein the first layer is coupled to the second layer by the stitch network such that the surface of each cell unit defines a bulge in the composite panel when the second layer is in the contracted state and a height of said bulge is reduced when the second layer is in the stretched state, wherein the maximum elongation of the second layer in the first direction is at least 100%, and wherein the maximum elongation of the first layer in the second direction is less than 10%, and wherein the stitch network is an embroidery stitch network provided by embroidered stitches including a top thread exposed on an exterior of the article of footwear.

12. The article of footwear of claim 11 wherein each cell unit is defined along a perimeter, wherein the perimeter defines a reentrant shape.

* * * * *